Patented May 13, 1952

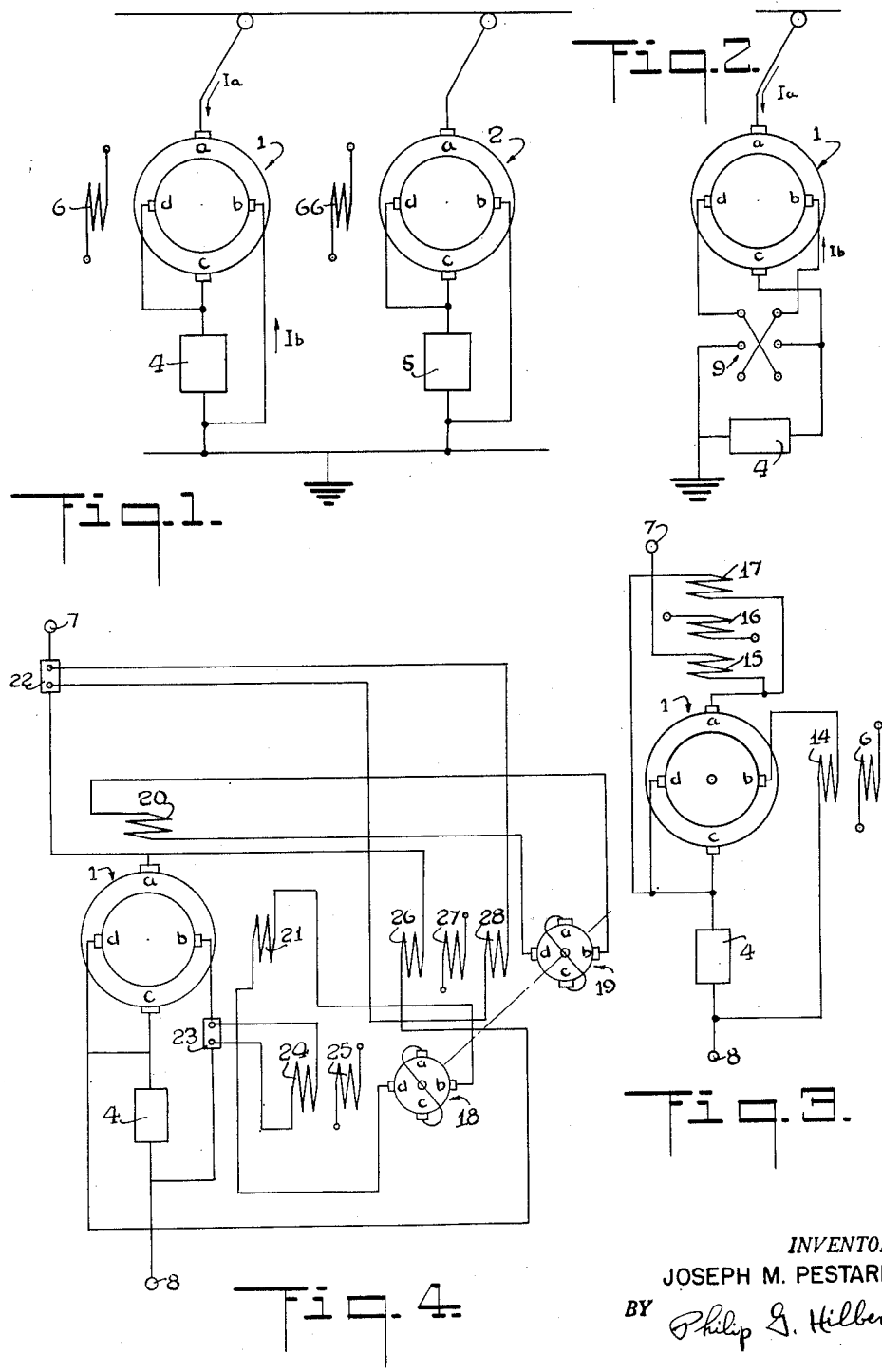

2,596,431

UNITED STATES PATENT OFFICE 2,596,431

DIRECT-CURRENT ROTARY TRANSFORMER

Joseph Maximus Pestarini, New York, N. Y.

Application January 21, 1947, Serial No. 723,432

6 Claims. (Cl. 323—13)

This invention relates to direct current rotary transformers.

An object of this invention is to provide a rotary transformer including a pair of armature windings, each winding having a commutator associated therewith and a pair of brushes on each commutator, the pairs of brushes being displaced relative to each other in a manner whereby the ampere turns of each winding induces an electromotive force between the brushes of the commutator associated with the other winding.

Another object of this invention is to provide in combination with a rotary transformer of the character described, a load circuit and a power circuit, together with a stator winding on the transformer located in a manner to control the current input to the load circuit.

A further object of this invention is to provide in a transformer of the character described, wherein a single rotor member therein includes a pair of separate armature windings, both of which interlink a common magnetic circuit.

Yet another object of this invention is to provide a transformer of the metadyne type which includes a plurality of displaced commutating axes, together with stator windings located on the commutating axes for controlling the operation of the transformer, and amplifier metadynes in circuit with the stator windings for supplying control currents thereto.

The metadyne, hereinafter referred to, has been described in a number of U. S. Patents issued to the applicant including 2,055,240; 1,987,417; 2,038,380; 2,049,389; and 2,079,465. A detailed description of the metadyne is found in Revue Generale de l'Electricite, published in Paris, France, more particularly, the March 8 and 15, August 16 and 23, November 22 and 29, and December 6, 1930, numbers thereof.

The invention will be better understood by reference to the following specification, taken in conjunction with the accompanying drawnigs.

In the drawings, Fig. 1 is a schematic diagram of a pair of rotary transformer metadynes in circuit with a load and a source of power, in accordance with the invention; Fig. 2 is a schematic diagram showing a modification thereof; Figs. 3 and 4 are schematic diagrams showing further modifications thereof.

Referring in detail to the drawing, and particularly to Fig. 1, there is shown a rotary transformer 1 which embodies the invention. The same comprises a primary armature winding having associated therewith primary brushes $a$, $c$ in opposed relation and located 180 electrical degrees from one another. The transformer also includes a separate secondary armature winding having associated therewith secondary brushes $b$, $d$, also in opposed relation and located 180 electrical degrees from one another. The primary brushes are displaced substantially 90 electrical degrees from the secondary brushes.

A load or consumer indicated at 4, is connected in series with brushes $a$, $c$ and a power source indicated as an overhead line and ground return circuit. The load 4 is further connected in parallel with the secondary brushes $b$, $d$.

It will be apparent that the armature ampere turns created by the armature winding associated with brushes $a$, $c$, will induce an electromotive force between brushes $b$, $d$, while the armature ampere turns created by the armature winding associated with brushes $b$, $d$, will induce an electromotive force between brushes $a$, $c$. Thus the two armature windings interlink a common magnetic circuit.

Indicating the current entering the brush $a$ as $I_a$ and the current entering the brush $b$ as $I_b$, it will be apparent that the load 4 is traversed by the sum of the currents $I_a + I_b$.

Assuming that the voltage absorbed by the load or consumer equals half the voltage supplied by the overhead line, then the voltage imposed on the brushes $a$, $c$ of the transformer metadyne will be equal to half of the overhead line voltage and the power absorbed by the consumer 4 will be greater than the power transformed by the metadyne 1. Actually, the power transformed by the metadyne 1 is equal to $$\tfrac{1}{2}\sqrt{I_a}$$

while the power absorbed is equal to $$\tfrac{1}{2}\sqrt{I_a + I_b}.$$

The ratio between the power transformed by the metadyne and the power controlled thereby or the power absorbed by the consumer, may become very small when the voltage of the consumer increases and approaches the overhead line voltage.

The value of the secondary current $I_b$ may be readily modified by means of the ampere turns of a stator winding 6 independently energized and having its magnetic axis along the direction of the flux created by the secondary armature ampere turns.

As shown in Fig. 1, another transformer metadyne 2, similar to metadyne 1, is connected in circuit with the power source and a consumer or load 5, as previously described. The secondary current of metadyne 2 is controlled by means of a stator winding 66.

Fig. 2 shows the transformer metadyne 1 particularly arranged for traction purposes. The consumer 4 may take the form of a motor which operates as a generator when the vehicle driven thereby, is to be braked. When braking the direction of the primary current is reversed, and it is preferable in such case to also reverse the direction of the secondary current when the same is transversing the consumer. It has been found that the operation of the regulating means which maintains the speed of the transformer metadyne substantially constant by suitable compensation of the torque created by the armature currents acting upon the magnetic field, is simplified, if the secondary current traverses the armature of the transformer metadyne in the same direction, even when the consumer is recuperating power. To this end, a reversing switch 9 is suitably connected in the load and brush circuits, as shown in Fig. 2.

So far only the main connections between the brushes of the transformer metadyne and the power source, have been considered. However, it is understood that the metadyne may be provided with various arrangements of stator windings, whereby to obtain any desired volt-ampere characteristic, to allow rotation at constant speed by means of a suitable regulator, or to allow rotation at variable speed with a flywheel effect, as more fully described in application Ser. No. 715,792, filed December 12, 1946.

Thus, as shown in Fig. 3, the transformer metadyne 1 includes a stator control winding 14 connected in series with brush b and current input terminal 8 and a stator control winding 15 connected in series with brush a and current input terminal 7. Another stator control winding 17 is connected across brushes a, c. Stator control winding 6 is arranged for independent excitation as previously described, while stator control winding 16 is adapted to be energized with a regulator current provided by a regulator dynamo, not shown, as described in Patents 2,049,389 and 2,055,240. Such regulator current will vary very rapidly in response to small variations in the speed of the rotary transformer, as more fully explained in said patents.

The control windings 15, 16 and 17 have their magnetic axes coincident with the commutating axis of brushes a, c, while control windings 6, 14 have their magnetic axes coincident with the commutating axis of brushes b, d.

In order to reduce the number of stator windings and their incident losses, electrodynamic machines known as amplifier metadynes, more fully described in Patent 2,112,604, may be used to energize single control windings having the combined characteristics of the several windings replaced thereby.

Thus, as shown in Fig. 4, the control windings 15, 16 and 17 may be consolidated into a single winding 20 while control windings 6, 14 may be consolidated into a single winding 21. The winding 21 is energized by the output of an amplifier metadyne 18 through brushes b, d, thereof, the other brushes a, c being short circuited. Similarly, winding 20 is energized by the output of an amplifier metadyne 19 through its brushes b, d, the brushes a, c thereof being short circuited. The amplifier metdaynes 18, 19 are coupled to each other.

The amplifier metadyne 18 includes control windings 24, 25 which control the output thereof and produce in winding 21 the effects previously obtained by windings 6, 14. Accordingly, winding 24 is traversed by a current proportional to the secondary current of the metadyne 1, by reason of its connection through shunt 23. Winding 25 is independently energized.

The amplifier metadyne 19 includes control windings 26, 27 and 28 which control the output thereof and produce in winding 20, the effects previously obtained by the separate windings 17, 16 and 15. Accordingly, winding 26 is connected across brushes a, c of the metadyne 1; winding 27 is independently energized and winding 28 is connected by a shunt 22 between current input terminal 7 and brush a, thus allowing a current proportional to the transformer primary current to traverse said winding.

It is understood, that the transformer metadynes may be connected in series, as well as in parallel, as shown in Fig. 1. It is also understood that the reversing switch 9, referred to in Fig. 2, may be inserted in the appropriate control windings of the transformer metadyne, to obtain the desired inversion of currents, thereby reducing the size of the necessary switch gear.

Since various changes may be made in the embodiments described, without departing from the spirit of the invention, it is understood that all matter herein set forth or shown in the drawings, is to be interpreted as illustrative and not in a limiting sense.

What I claim is:

1. An electric power system comprising a power supply circuit, a load circuit, a rotary transformer, said transformer comprising a pair of armature windings, a commutator associated with each of said windings, a pair of primary brushes per cycle associated with one of said commutators and a pair of secondary brushes per cycle associated with the other commutator, said pair of primary brushes being displaced relative to said pair of secondary brushes whereby current traversing one of said pairs of brushes creates a flux inducing an electromotive force between the brushes of the other of said pairs of brushes, and comprising further stator windings for controlling the operation of said transformer, and a plurality of amplifier metadynes, means for connecting said power supply circuit between one primary brush and one secondary brush, means for connecting said load circuit between said one secondary brush and the other primary brush, said other primary brush and the other secondary brush being connected together, connecting means between each of said stator windings and one of said amplifier metadynes whereby said amplifier metadynes supply said stator windings with control currents.

2. An electric power system comprising a source of power, a load and a rotary transformer including a pair of separate armature windings, a commutator associated with each winding, a pair of brushes displaced 180 electrical degrees from one another on each commutator, said pairs of brushes being displaced substantially 90 electrical degrees from one another, each of said windings being operative to induce an electromotive force between the brushes associated with the other winding, said load being connected in series with said power source and one pair of diametrically opposite brushes, said load being further connected in parallel with the other pair of diametrically opposite brushes, one brush of one pair of brushes being directly connected to one brush of the other pair of brushes.

3. An electric power system as in claim 2, wherein said transformer further includes a stator winding for controlling the current supplied to said load by the pair of brushes connected in parallel therewith, said control winding having a magnetic axis coincident with the commutating axis of said last mentioned pair of brushes.

4. An electric power system as in claim 2, and further including means for reversing the current flow in said ssytem.

5. An electric power system as in claim 3, wherein said transformer further includes at least one stator winding for controlling the operation thereof, said last mentioned stator winding having a magnetic axis coincident with the commutating axis of said one pair of brushes.

6. An electric power system as in claim 5, and further including means for supplying a regulator current to said last mentioned stator winding.

JOSEPH MAXIMUS PESTARINI.

REFERENCES CITED

The following references are of record in the file of this patent:

UNITED STATES PATENTS

| Number | Name | Date |
| --- | --- | --- |
| 921,693 | Hall | May 18, 1909 |
| 1,468,157 | Holifield | Sept. 18, 1923 |
| 1,526,613 | Stephenson | Feb. 17, 1925 |
| 2,059,024 | Pestarini | Oct. 27, 1936 |